United States Patent
Rottleuthner

[11] 3,731,355
[45] May 8, 1973

[54] ROLLER BURNISHING TOOL

[75] Inventor: Heinz H. Rottleuthner, Neu Isenburg, Germany

[73] Assignee: Amtel, Inc., Providence, R.I.

[22] Filed: Sept. 27, 1971

[21] Appl. No.: 183,982

Related U.S. Application Data

[63] Continuation-in-part of Ser. No. 21,807, March 23, 1970.

[52] U.S. Cl. ...................................................29/90
[51] Int. Cl. ............................................B24b 39/00
[58] Field of Search.........................................29/90

[56] References Cited

UNITED STATES PATENTS

| | | | |
|---|---|---|---|
| 2,170,631 | 8/1939 | Cogsdill | 29/90 |
| 2,069,099 | 1/1937 | Satterthwaite | 29/90 |
| 1,917,925 | 7/1933 | Cogsdill | 29/90 |

FOREIGN PATENTS OR APPLICATIONS

| | | | |
|---|---|---|---|
| 494,481 | 10/1938 | Great Britain | 29/90 |
| 514,319 | 2/1955 | Italy | 29/90 |

Primary Examiner—Leonidas Vlachos
Attorney—Barlow & Barlow

[57] ABSTRACT

A roller burnishing tool having a series of processing rolls mounted in a cage which rolls are actuated radially outward or radially inward as the case might be, the rollers operating against a work piece. The mandrel is constructed in a fashion whereby it not only creates a surface against which the rollers are pressed but is also fashioned to periodically force the rollers against the surface to be processed so as to peen the surface and also to press against the surface during another part of their rotation about the mandrel.

12 Claims, 4 Drawing Figures

INVENTOR
HEINZ H. ROTTLEUTHNER
BY
Barlow+Barlow
ATTORNEYS

ROLLER BURNISHING TOOL

CROSS REFERENCE TO RELATED APPLICATION

This application is a continuation-in-part of my co-pending application Ser. No. 21,807, filed Mar. 23, 1970.

BACKGROUND OF THE INVENTION

Tools for finishing surfaces by burnishing are in general use today in the machining industry and involve a compacting of the surface material of the work piece under pressure to establish a high grade finish or for locally work hardening of the surface of the work piece. They operate by the application of intense pressure by the use of a planetary system of rollers operating against the work piece which rollers are either forced radially outward by a tapered mandrel or are forced radially inward by a confining annular mandrel. The axes of the rollers are disposed generally at an angle to the axis of the mandrel and work piece which results in a tendency of the rollers to move in a helical path about the surface of the work piece and burnishing tools having these general characteristics are illustrated in U.S. Pat. Nos. 2,835,958 and 2,843,918. It has also been proposed to modify this type of construction and provide a peening action by periodically relieving the pressure of engagement of the rollers on the cylindrical work piece. Such an arrangement of a tool for peening is shown in U.S. Pat. No. 2,069,099 and basically involves the modification of the mandrel by providing a number of spaced axially extending cams on the surface of the mandrel for periodically forcing the rollers radially of the mandrel so as to achieve an outward or inward blow against the surface being formed, all rolls moving radially simultaneously. Utilizing merely a peening action results in a cylindrical finished piece which can under microscopic examination be found to have a number of ridges and depressions which are caused by the impact of the rollers against the surface. The surface thus compacted is not made entirely smooth. Further in the use of a standard burnishing tool which has a smooth frusto-conical tapered mandrel surface, since all of the rollers are in constant contact with the cylindrical work piece that is being operated upon, considerable power is necessary to operate the tool due to the large friction loading of the rollers. It is desirable, therefore, to combine some of the better effects of the two methods of operating upon a cylindrical work piece and reduce the amount of power necessary to operate the roller burnishing tool, while at the same time achieving a compacting by peening and simultaneous smoothing by rolling.

SUMMARY OF THE INVENTION

The instant invention is directed to a roller burnishing tool having a tapered mandrel and roller cage assembly which assembly is movable axially with relation to the mandrel for expanding the tapered rollers either radially inward or radially outward and in which the mandrel is formed in such a fashion that the rollers may be periodically released and at the same time at least three rollers are in pressure contact with the work piece. In its simplest form the tool would consist of a plurality of rollers in which three rollers are in surface contact with the work piece at all times and three rollers are partially or fully relieved and away from the work piece depending upon the position of the three rollers on the land areas. The numbers of rollers may be varied, the main criteria being that they provide in the final configuration at all points about the mandrel three point contact, that is three rollers which are in pressure contact with the work piece at all times on land areas.

DESCRIPTION OF THE PREFERRED EMBODIMENT

Figure 1:
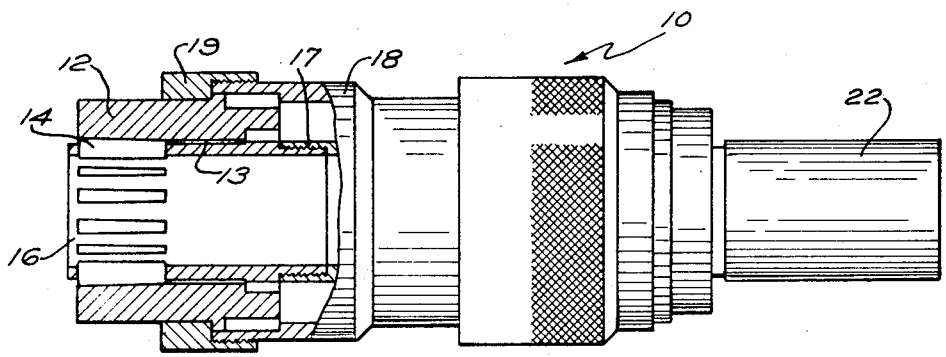
FIG. 1 is an elevational view partly in section of a tool embodying this invention.

With reference to the drawings, 10 generally designates an O.D. type of roller burnishing tool which has a revolvable mandrel 12, tapered rollers 14, a cage 16 with its inward extension thereof 17, all of which is secured to the general front end housing 18, the mandrel being held there by a nut 19 and the cage extension being secured suitably into the adjusting means which are not shown but which may be similar to as, for example, that shown in the Koppelmann U.S. Pat. No. 2,843,918. It is intended that the tool be fixed in a machine tool and either rotated or held stationary relative to the work as processing dictates and for this purpose a drive shank 22 is provided.

Figure 2:
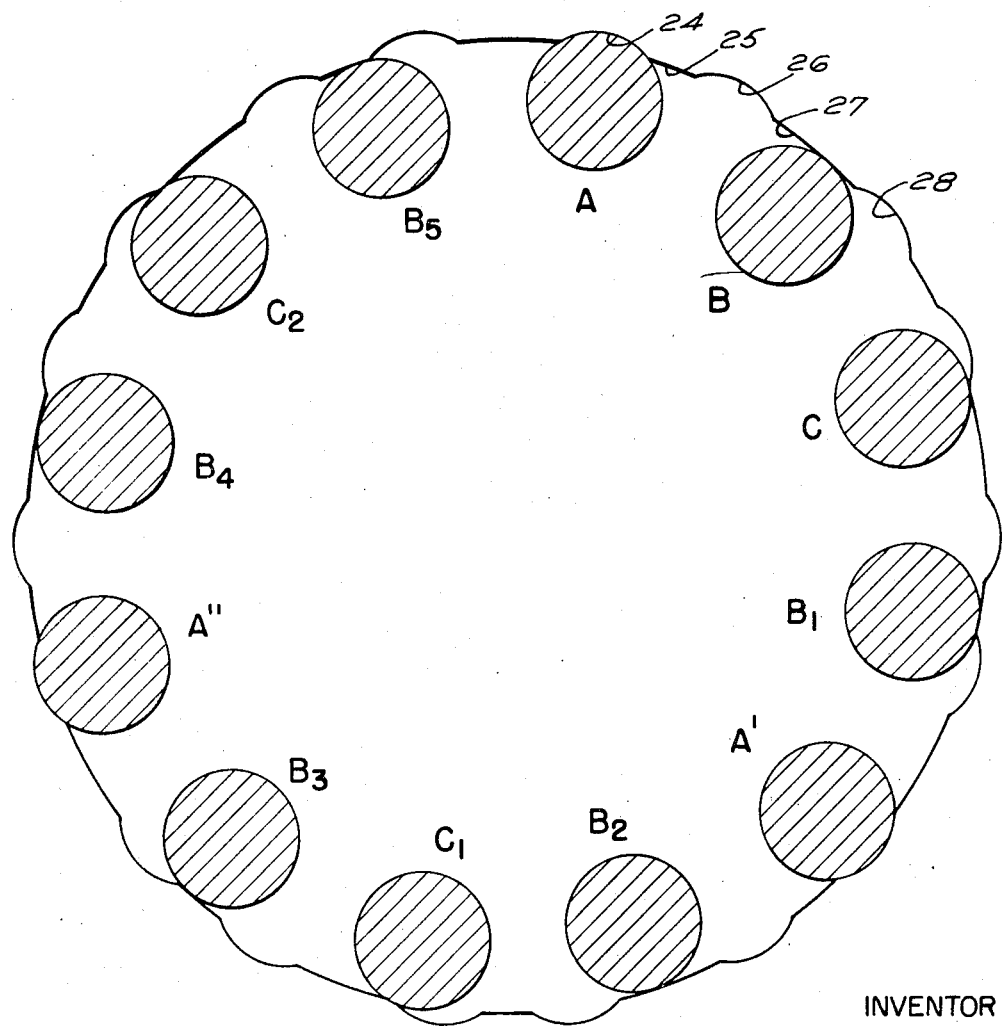
FIG. 2 is a diagrammatic view which may be considered substantially an end view of the device shown in FIG. 1.

The rolls 14 are identical to each other and are held in assembled relation by the cage 16 in a plurality of slots in the cage which slots are slightly angled to the axial extent of the cage a small amount to produce the necessary automatic feeding thereof as described in the above-referred to Koppelmann patent. The inner frusto-conical surface 13 of the mandrel 12, which is depicted in large form in FIG. 2, is divided geometrically into a generally axially extending groove which subtends a chordal distance of a finite amount followed by an arc of another finite distance followed by a second groove subtending the same chordal distance and thence by another arc of still a further finite distance. This sequence is repeated through 360°. Various mandrel configurations are possible, for example, utilizing the 12 rollers and 18 grooves of FIG. 2, a similar result will be secured by dividing the mandrel into a similar sequence but by using only 12 grooves instead of the illustrated 18. The difference would lie in the number of rollers that at any one instance are in contact with the work piece and thus would be the rollers on the arcuate sections. To appreciate how the arrangement of FIG. 2 is made, let us start with the roller indicated by the letter A which is received wholly within the groove 24. Going clockwise, we find that there is a small arcuate section 25 of the inner surface of the mandrel which can be termed a land, followed by a second groove 26, a longer arcuate section 27, which can also be termed a land, and thence a third groove 28. This arrangement repeats itself about the entire arcuate portion of the inner surface of the mandrel so that in effect we have a groove, a small arc, a groove, a larger arc and a groove again. It will also be noted that there are three rollers filling a groove such as 24, 26, 28, these rollers each being identified as A, A', A''. Additionally there are a number of rollers which are on the arcuate section of the mandrel inner surface, these being identified as B, $B_1$, $B_2$, $B_3$, $B_4$ and $B_5$. Additionally, we find that there are a number of rollers which are just rising out of a groove and which we will term to be in peening action toward the work piece, each of these rollers being identified as C, $C_1$ and $C_2$. At any given point in time it can be shown that there are at least three rollers such as B in contact with the work piece or effectively in contact with the arcuate inner surface of the mandrel, that at least three rollers will be within the grooves such as 24, 26, 28 and that at least three rollers will be rising immediately out of the grooves to strike the work piece being operated upon these latter ones, of course, being designated by the letter C in the single diagrammatic view of FIG. 2. It can be seen therefore that effectively there is a peening action and a rolling burnishing action occurring simultaneously with the tool of this invention, at least three rollers being periodically forced inwardly into engagement with the surface to be finished while at the same time rolls are in pressure engagement such as the roll B with the surface to be finished. The end result of this arrangement is that the peening action of the peening rolls will be smoothed by the rolls that are in pressure engagement so that a double desirable result is secured, namely that of compacting the work by peening and smoothing the work by rolling.

Figure 3:
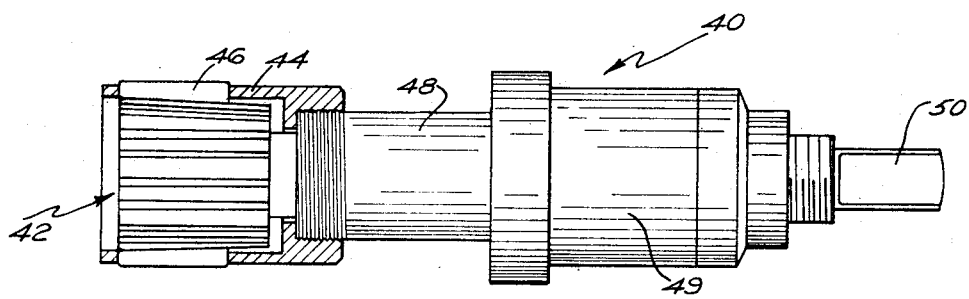
FIG. 3 is a side view partly in section of another form of tool embodying the invention which is used for burnishing.
Figure 4:
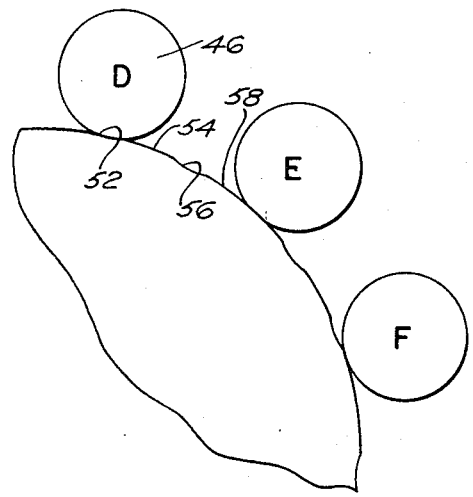
FIG. 4 is a diagrammatic view similar to FIG. 2 illustrating the manner in which the rolls operate about the surface of the mandrel and can be considered an end view of a sector of the FIG. 3 view.

In FIG. 3 of the drawings a typical I.D. form of roller burnishing tool is illustrated and which is generally designated by the numeral 40 and which consists of a mandrel 42 that is surrounded by a roller cage 44 that supports a number of rollers 46 each at a slight angle to the longitudinal axis of the mandrel 42 in similar manner to rollers 14. The roller cage is secured to the tool body 48 in a suitable fashion and normal adjustment means are found in the housing at 49 the entire tool having a mounting shank 50 for supporting the same for either rotation or fixed position depending upon the manner in which the tool is to be used. A construction of the internals of this tool can take a variety of forms and as, for example, may be similar to that as shown in the Mock et al. U.S. Pat. No. 2,835,958. The mandrel 42 which is an internal mandrel is constructed in a similar fashion to that as illustrated in FIG. 2 of the drawing, except it has an external frusto-conical surface, and because of the similarity and the similarity of function of the two devices save the fact that one is an I.D. tool and the other is an O.D. tool only a portion of the surface of the mandrel 42 with generally axially extending grooves in enlarged form has been illustrated in FIG. 4. To this end, therefore, we find tapered rollers 46 in three prime positions. At position D the roller fills a groove 52 in the mandrel while the roller at position E is on the outer arcuate surface of the mandrel 42 and the roller at position F is coming out of one of the grooves of the mandrel. In similar fashion the outer surface of the mandrel is divided into a number of parts and for illustrative purposes we have utilized twelve rollers 46 and grooves 52 angularly and have a first short arcuate portion of the surface of the mandrel such as at 54, then another recess 56 and a longer arcuate surface 58 which is repeated as we go about the surface of the mandrel.

There are many combinations of rollers and groove and land configurations which will operate effectively in a roller burnishing tool embodying the invention but not all combinations of rollers and groove and land configurations will operate in such a manner that there are always three rollers in engagement with the lands.

There is no unique mathematical relationship between the number of rollers and the number of grooves. The number of grooves in an operative burnishing tool of the invention will be given by the expression $3n + 3x$ where $n$ is any whole integer and $x$ is a number in the series 0,3,6,9, 12, — $3m$ where $m$ is an integer.

Moreover, there is no unique mathematical expression which will give one of the arcuate lengths of the lands between the grooves and therefore in designing a roller burnishing tool embodying the invention non-inventive experiments may have to be carried out to determine the appropriate arrangements of grooves, lands and rollers. Thus in practice one may lay out in a drawing some ten times full size starting with a known mandrel size and a known size of burnishing roller. The first thing to do is to determine how many rollers will be used to co-operate with the mandrel. The maximum number of rollers of a given size which can be used is preferable. Then one begins to lay out the grooves and lands on the drawing of the mandrel surface and can, by using overlays representing the rollers in the cage, gradually produce the necessary arrangement of grooves and lands to ensure that at least three rollers or more if desired are always in contact with the lands and thus, when the tool is in operation, with the workpiece. In the examples described, where the adjacent lands are of different sizes, trhe sizes of the lands has been determined in this manner.

The simplest case is that utilizing six rollers with three grooves in the mandrel surface, the lands between the grooves being of equal arcuate length.

This configuration will produce an action which for most of the time will have three rollers in contact with the lands and work piece and three rollers relieved in the grooves except for a very small degree of rotation, which might be say 0.030 inch of arc, when all six rollers would be in contact with the work piece and riding on the lands.

It is believed that if more than six rollers are used then the rollers should be in sets of three, four or five.

Expressing the set of three this would yield the numbers six, nine, 12 and 15; expressing the set of four would yield eight, 12 and 16; and expressing the set of five would yield 10, 15 and 20. Numbers higher than this become impractical to utilize although they are conceivable if the sets were continued. Possible combinations, therefore, are nine and 12 rollers with 12 grooves each and 15 rollers with 24 grooves. Further as a generalized statement in laying out the preferred geometry of the invention, except for the minimum number of rollers namely six, there are never less than one-third nor more than two-thirds of the rollers in contact with the lands and the work piece, the grooves acting as reliefs.

What I claim as my invention is:

1. A roller burnishing tool comprising a mandrel member having a tapered angular surface which extends in the direction of the axis of the mandrel, the annular surface of the mandrel having a plurality of generally axially extending grooves therein, land areas between said grooves, said grooves being angularly spaced from each other by said lands about the annular surface, at least six rotatable tapered rollers supported on the annular surface of said mandrel at an angle to the axis of the mandrel, means for retaining the rolls in assembled relationship of equal angular displacement relative to each other, means for moving the rolls axially of the tapered surface of said mandrel as well as angularly with respect thereto, the relationship between the rollers, the lands and the grooves being such that at least three rollers are in contact with lands at all times.

2. A roller burnishing tool as in claim 1 wherein the distance between grooves alternates in arc.

3. A roller burnishing tool as in claim 1 wherein there are six rollers, three grooves and three lands.

4. A roller burnishing tool as in claim 1 wherein there are nine rollers, 12 grooves and 12 lands of two finite arcuate lengths that alternate between said grooves.

5. A roller burnishing tool as in claim 1 wherein there are 12 rollers, 12 grooves and 12 lands of two finite arcuate lengths that alternate between said grooves.

6. A roller burnishing tool as in claim 1 wherein there are 15 rollers, 24 grooves and 24 lands of two finite arcuate lengths that alternate between said grooves.

7. A roller burnishing tool comprising a mandrel having a frusto-conical surface co-axial with the longitudinal axis of the mandrel, a plurality of axially extending grooves in said surface, the grooves being spaced apart by portions of the surface which forms lands, a plurality of rotatable rollers arranged to engage said surface and mounted in means rotatable about the mandrel and which hold the rollers equi-angularly spaced about, and with their longitudinal axes at an angle to, the longitudinal axis of the mandrel and means for moving the rollers relative to the mandrel in directions parallel to the longitudinal axis of the latter, the number of rollers being at least six and the number of the rollers and the number, location and extent of the grooves and lands being such that in all operative relative positions of the rollers and the mandrel at least three of the rollers are in contact with said lands.

8. A roller burnishing tool as in claim 7 wherein the arcuate lengths of the lands on opposite sides of each groove are different.

9. A roller burnishing tool as in claim 7 wherein there are six rollers, three grooves and three lands.

10. A roller burnishing tool as in claim 8 wherein there are nine rollers, 12 grooves and 12 lands.

11. A roller burnishing tool as in claim 8 wherein there are 12 rollers, 12 grooves and 12 lands.

12. A roller burnishing tool as in claim 8 wherein there are 15 rollers, 24 grooves and 24 lands.

* * * * *